United States Patent
Chae et al.

(10) Patent No.: US 10,203,546 B2
(45) Date of Patent: Feb. 12, 2019

(54) LIQUID CRYSTAL DISPLAY DEVICE AND METHOD OF MANUFACTURING THE SAME

(71) Applicant: SAMSUNG DISPLAY CO., LTD., Yongin-si, Gyeonggi-do (KR)

(72) Inventors: Kyungtae Chae, Hwaseong-si (KR); Kanguk Kim, Hwaseong-si (KR); Donchan Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/648,870

(22) Filed: Jul. 13, 2017

(65) Prior Publication Data

US 2018/0017829 A1 Jan. 18, 2018

(30) Foreign Application Priority Data

Jul. 14, 2016 (KR) ........................ 10-2016-0089145

(51) Int. Cl.
| | |
|---|---|
| *G02F 1/1335* | (2006.01) |
| *G02F 1/1343* | (2006.01) |
| *G02F 1/1368* | (2006.01) |
| *G02F 1/1333* | (2006.01) |
| *G09G 3/36* | (2006.01) |

(52) U.S. Cl.
CPC .. *G02F 1/133528* (2013.01); *G02F 1/133512* (2013.01); *G02F 1/133617* (2013.01); *G02F 1/1368* (2013.01); *G02F 1/134309* (2013.01); *G02F 2001/133357* (2013.01); *G02F 2001/133548* (2013.01); *G02F 2201/121* (2013.01); *G02F 2201/123* (2013.01); *G02F 2202/36* (2013.01); *G02F 2203/34* (2013.01); *G09G 3/3677* (2013.01); *G09G 3/3688* (2013.01); *G09G 2310/08* (2013.01)

(58) Field of Classification Search
CPC ......... G02F 1/133528; G02F 1/133512; G02F 1/134309; G02F 1/1368
See application file for complete search history.

(56) References Cited

U.S. PATENT DOCUMENTS

| | | | |
|---|---|---|---|
| 8,294,853 B2 | 10/2012 | Matsushita | |
| 2010/0123860 A1 | 5/2010 | Kim et al. | |
| 2015/0124188 A1* | 5/2015 | Kadowaki | G02F 1/133553 349/42 |
| 2015/0176775 A1* | 6/2015 | Gu | F21K 9/60 349/42 |

FOREIGN PATENT DOCUMENTS

| | | |
|---|---|---|
| JP | 2000-155208 | 6/2000 |
| JP | 2006-30650 | 2/2006 |
| KR | 10-2013-0000506 | 1/2013 |

* cited by examiner

*Primary Examiner* — Anne M Hines
(74) *Attorney, Agent, or Firm* — Innovation Counsel LLP

(57) ABSTRACT

A liquid crystal display device includes: an upper substrate; a light blocking layer disposed on the upper substrate; a residual pattern disposed on the light blocking layer; a color conversion portion disposed at an area defined by the residual pattern; a planarization layer disposed on the color conversion portion and the residual pattern; and an upper polarization plate disposed on the planarization layer.

20 Claims, 16 Drawing Sheets

LIQUID CRYSTAL DISPLAY DEVICE AND METHOD OF MANUFACTURING THE SAME

CROSS-REFERENCE TO RELATED APPLICATION

This application claims priority under 35 U.S.C. § 119 to Korean Patent Application No. 10-2016-0089145, filed on Jul. 14, 2016, in the Korean Intellectual Property Office (KIPO), the disclosure of which is incorporated by reference herein in its entirety.

TECHNICAL FIELD

Exemplary embodiments of the present inventive concept relate to a liquid crystal display ("LCD") device and a method of manufacturing the LCD device and more particularly, to an LCD device capable of improving a step difference generated in an upper panel and a method of manufacturing the LCD device.

DISCUSSION OF RELATED ART

Liquid crystal display ("LCD") devices are a type of flat panel display (FPD) devices which have found wide recent applications. The LCD device includes two substrates including electrodes formed thereon and a liquid crystal layer interposed therebetween.

Upon applying voltage to the two electrodes, liquid crystal molecules of the liquid crystal layer are rearranged such that an amount of transmitted light is controlled in the LCD device. To this end, the LCD devices require a backlight unit that may provide light.

The light emitted from the backlight unit passes through a polarizer and the liquid crystal layer of the LCD device to display an image. In such an example, the polarizer of the LCD device may be positioned inside a display panel. In such an example, in order to improve the polarization efficiency of the polarizer, the flatness of a lower layer of the polarizer needs to be excellent.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments of the present inventive concept may be directed to an LCD device that may improve the flatness of a display panel, in particular, a lower layer of a polarizer and to a method of manufacturing the LCD device.

According to an exemplary embodiment, a liquid crystal display device includes: an upper substrate; a light blocking layer disposed on the upper substrate; a residual pattern disposed on the light blocking layer; a color conversion portion disposed at an area defined by the residual pattern; a planarization layer disposed on the color conversion portion and the residual pattern; and an upper polarization plate disposed on the planarization layer.

The upper polarization plate may include a wire grid polarizer (WGP).

The color conversion portion may include at least one of quantum dot particles or quantum rod particles.

The light blocking layer may include a metal.

The light blocking layer may include a first light blocking pattern and a second light blocking pattern crossing the first light blocking pattern.

The residual pattern may include a first residual pattern disposed on the first light blocking pattern and a second residual pattern disposed on the second light blocking pattern.

The first residual pattern may have a different height from a height of the second residual pattern.

The residual pattern may include a black pigment or a black resin.

The the residual pattern may have substantially the same planer shape as the light blocking pattern.

The residual pattern may have a width smaller than that of the light blocking pattern.

A total thickness of the light blocking layer and the residual pattern may be substantially the same as that of the color conversion portion.

According to another exemplary embodiment, a method of manufacturing a liquid crystal display device includes: forming a light blocking layer and a residual pattern on an upper substrate; forming a color conversion portion on a transmission region defined by the light blocking layer and a residual pattern on the upper substrate; forming a planarization layer on the residual pattern and the color conversion portion; and forming an upper polarization plate on the planarization layer.

The upper polarization plate may include a wire grid polarizer (WGP).

The color conversion portion may include quantum dot particles or quantum rod particles.

The light blocking layer may include a metal.

The forming of the light blocking layer and the residual pattern on the upper substrate may include: forming a light blocking layer forming material on the upper substrate; applying a photoresist on the light blocking layer material; patterning the photoresist; and etching the light blocking layer forming material using the patterned photoresist as an etching mask.

The residual pattern may include a black pigment or a black resin.

The forming of the color conversion portion may use an inkjet process.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the present inventive concept will become more apparent by describing in detail exemplary embodiments thereof with reference to the accompanying drawings, wherein.

DETAILED DESCRIPTION

Figure 1:
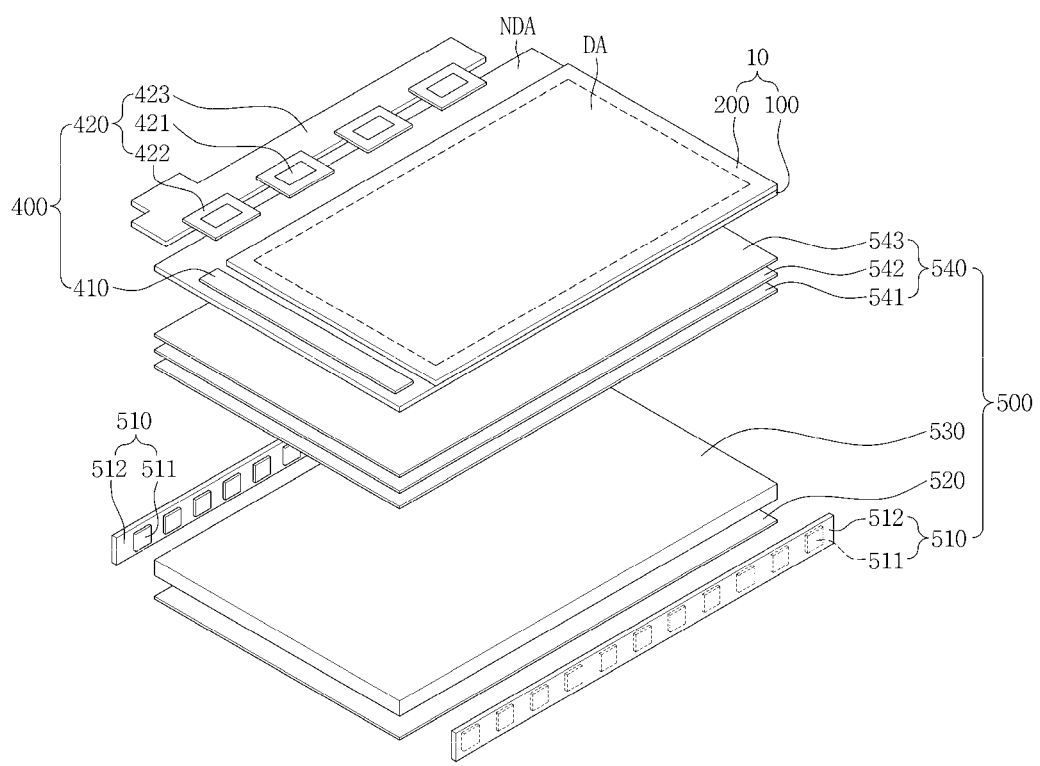
FIG. 1 is an exploded perspective view illustrating an LCD device according to an exemplary embodiment.

Exemplary embodiments will now be described more fully hereinafter with reference to the accompanying drawings. Although the inventive concept may be modified in various manners and have several exemplary embodiments, exemplary embodiments are illustrated in the accompanying drawings and will be mainly described in the specification. However, the scope of the inventive concept is not limited to the exemplary embodiments and should be construed as including all the changes, equivalents and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments of the present inventive concept and like reference numerals refer to like elements throughout the specification.

Hereinafter, a display device according to an exemplary embodiment will be described in detail with reference to FIGS. 1 to 12G. Herein, component names used in the following description are selected in consideration of ease of explanation and may be different from actual product names.

FIG. 1 is an exploded perspective view illustrating an LCD device according to an exemplary embodiment.

The LCD device according to an exemplary embodiment includes a display panel 10, a driver 400 and a backlight unit 500.

The display panel 10 includes a lower panel 100, an upper panel 200 and a liquid crystal layer (not illustrated).

The driver 400 includes a gate driver 410 and a data driver 420. The gate driver 410 is disposed in a non-display area (NDA) of the lower panel 100. The gate driver 410 generates gate signals in accordance with a gate control signal provided from a timing controller (not illustrated) and sequentially applies the gate signals to a plurality of gate lines. The gate driver 410 may include, for example, a shift register that shifts a gate start pulse in accordance with a gate shift clock to generate gate signals. The shift register may include a plurality of driving transistors.

The data driver 420 includes a plurality of data driving ICs 421. The data driving ICs 421 receive digital image data signals and a data control signal from a timing controller. The data driving ICs 421 sample the digital image data signals according to the data control signal, latch the sampled image data signals corresponding to one horizontal line in each horizontal period and apply the latched image data signals to the data lines DL1 to DLj. That is, the data driving ICs 421 convert the digital image data signals applied from the timing controller into analog image signals using a gamma voltage input from a power supply (not illustrated) and apply the converted analog image signals to the data lines DL1 to DLj.

Each of the data driving ICs 421 is mounted on a carrier 422. The carriers 422 are connected between a printed circuit board 423 and the display panel 10. The aforementioned timing controller and the power supply may be disposed on the printed circuit board 423 and the carrier 422 includes input wirings which transmit various signals applied from the timing controller and the power supply to the data driving ICs 421 and output wirings that transmit image data signals output from the data driving IC 421 to corresponding ones of the data lines. In an exemplary embodiment, at least one carrier 422 may further include auxiliary wirings that may transmit various signals applied from the timing controller and the power supply to the gate driver 410 and the auxiliary wirings are connected to panel wirings disposed on the lower panel 100. The panel wirings connect the auxiliary wirings and the gate driver 410 to one another. The panel wirings may be formed on the lower panel 100 in a line-on-glass manner.

The backlight unit 500 includes a light source unit 510, a reflective plate 520, a light guide plate 530 and an optical sheet 540.

The light source unit 510 generates light. The light generated in the light source unit 510 is provided to the display panel 10 through the light guide plate 530 and the optical sheet 540.

The light source unit 510 may include at least one light source 511 and a light source circuit board 512. The light source 511 emits light. The light source 511 may be a light emitting diode. For example, the light source 511 may be one of a red light emitting diode that emits red light, a green light emitting diode that emits green light and a blue light emitting diode that emits blue light. The light emitted from the light source 511 is incident on the light guide plate 530.

One surface of the light source circuit board 512 is divided into at least one mounting area and a wiring area, though not illustrated. In the case where the number of the light sources 511 is two or more, one light source 511 is installed in each mounting area and a plurality of wirings for transmitting a driving power to the light source 511 are disposed in the wiring area. The above-described driving power is generated in an external power supply (not illustrated) and then applied to the plurality of wirings via a separate connector (not illustrated).

The light guide plate 530 guides the light provided from the light source unit 510 to the display panel 10. The light guide plate 530 is disposed between the reflective plate 520 and the optical sheet 540. One of a plurality of surfaces included in the light guide plate 530 facing the light source 511 is to be defined as a light incidence surface.

The light emitted from the light source 511 is incident on the light incidence surface and then propagates to the inside of the light guide plate 530. The light guide plate 530 totally reflects the light that has entered into the light guide plate 530 to guide the light toward a display area of the display panel 10. In an exemplary embodiment, although not illustrated, a plurality of scattering patterns may be further provided on an outer lower surface of the light guide plate 530 in order to improve the reflectance of the light guide plate 530.

The light guide plate 530 may include a light transmitting material such as an acrylic resin, e.g., PMMA (PolyMethylMethacrylate) and polycarbonate (PC), to allow light to be efficiently guided.

The reflective plate 520 is disposed below the light guide plate 530. The reflective plate 520 reflects once again the light directed outwards through the outer lower surface of the light guide plate 530 to be guided again toward the light guide plate 530, thus improving luminous efficiency.

The optical sheet 540 diffuses and collimates light transmitted from the light guide plate 530. The optical sheet 540 may be disposed between the light guide plate 530 and the display panel 10. The optical sheet 540 may include a diffusion sheet 541, a light collimation sheet 542 and a protective sheet 543. The diffusion sheet 541, the light collimation sheet 542 and the protective sheet 543 may be sequentially stacked on the light guide plate 530.

The diffusion sheet 541 diffuses the light guided from the light guide plate 530 so as to substantially prevent the light from being partially concentrated.

The collimation sheet 542 is disposed on the diffusion sheet 541 and serves to collimate the light diffused from the diffusion sheet 541 in a direction perpendicular to the display panel 10. To this end, prisms, having a triangular cross-section, may be disposed on one surface of the collimation sheet 542 in a predetermined arrangement.

The protective sheet 543 is disposed on the collimation sheet 542, serves to protect a surface of the collimation sheet 542 and diffuses light to achieve uniform light distribution. The light propagating through the protective sheet 543 is provided to the display panel 10.

Figure 2:
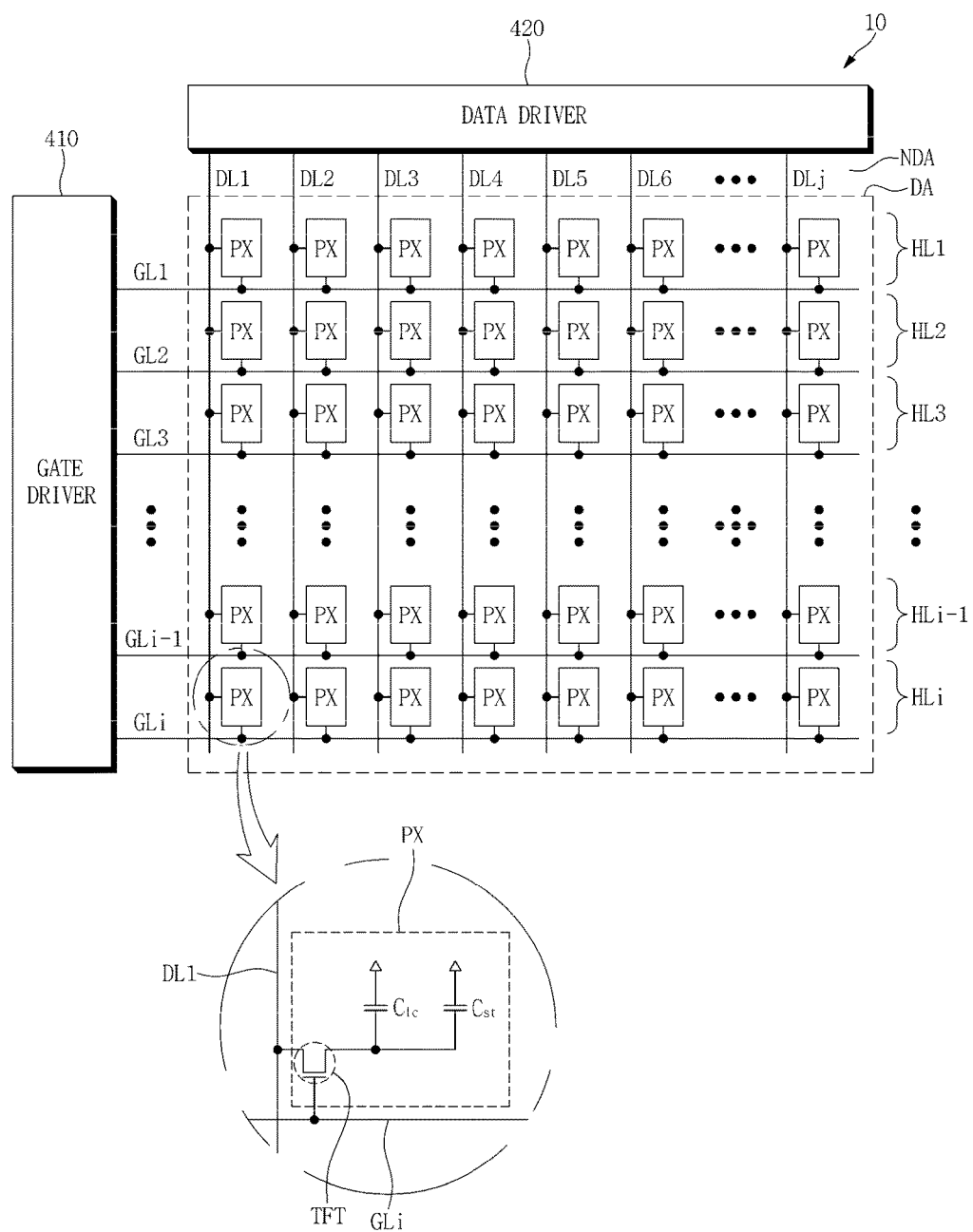
FIG. 2 is an explanatory view illustrating pixels arranged on a display panel.

FIG. 2 is an explanatory view illustrating pixels arranged on the display panel 10.

Referring to FIGS. 1 and 2, the display panel 10 includes a plurality of gate lines GL1 to GLi and a plurality of data lines DL1 to DLj. The data lines DL1 to DLj intersect the gate lines GL1 to GLi. The gate lines GL1 to GLi extend to the non-display area NDA to be connected to the gate driver 410 and the data lines DL1 to DLj extend to the non-display area NDA to be connected to the data driver 420.

The upper panel 200 defines a plurality of pixels PX together with the lower panel 100 and the liquid crystal layer 300. As illustrated in FIG. 2, the pixel PX is disposed in the display area DA of the display panel 10. The plurality of pixels PX adjacent to each other may form one unit pixel. For example, the plurality of adjacent pixels PX connected to a same gate line may form one unit pixel.

Adjacent pixels PX may be connected to different data lines. As in an example illustrated in FIG. 2, one pixel PX may be connected to an odd-numbered data line and another pixel PX adjacent to said one pixel may be connected to an even-numbered data line.

There are "j" number of pixels arranged along an n-th (n being one selected from 1 to i) horizontal line (hereinafter, n-th horizontal line pixels), which are connected to the first to j-th data lines DL1 to DLj, respectively. Further, the n-th horizontal line pixels are connected in common to the n-th gate line. Accordingly, the n-th horizontal line pixels receive an n-th gate signal as a common signal. That is, "j" number of pixels disposed in a same horizontal line receive a same gate signal, while pixels disposed in different horizontal lines receive different gate signals, respectively. For example, pixels in a first horizontal line HL1 receive a first gate signal as a common signal, while pixels in a second horizontal line HL2 receive a second gate signal that has a different timing from that of the first gate signal.

Each of the pixels PX includes a thin film transistor ("TFT"), a liquid crystal capacitor Clc and a storage capacitor Cst.

The TFT is turned on according to a gate signal applied from the gate line GLi. The turned-on TFT applies an analog image data signal applied from the data line DL1 to the liquid crystal capacitor Clc and the storage capacitor Cst.

The liquid crystal capacitor Clc includes a pixel electrode and an opposing electrode CE which oppose each other. In such an exemplary embodiment, the opposing electrode may be a previous gate line or a common line for transmitting a common voltage.

Figure 3:
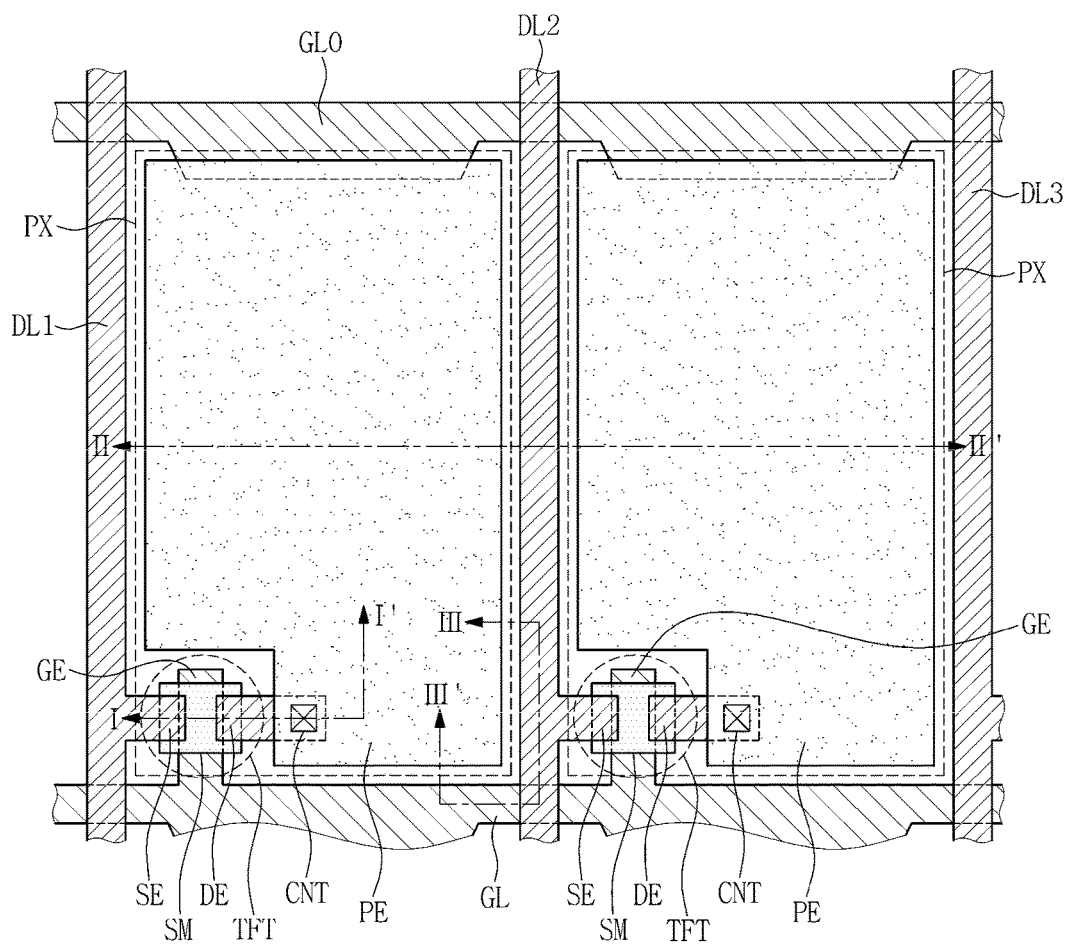
FIG. 3 is a plan view illustrating two adjacent pixels of FIG. 2.
Figure 4:
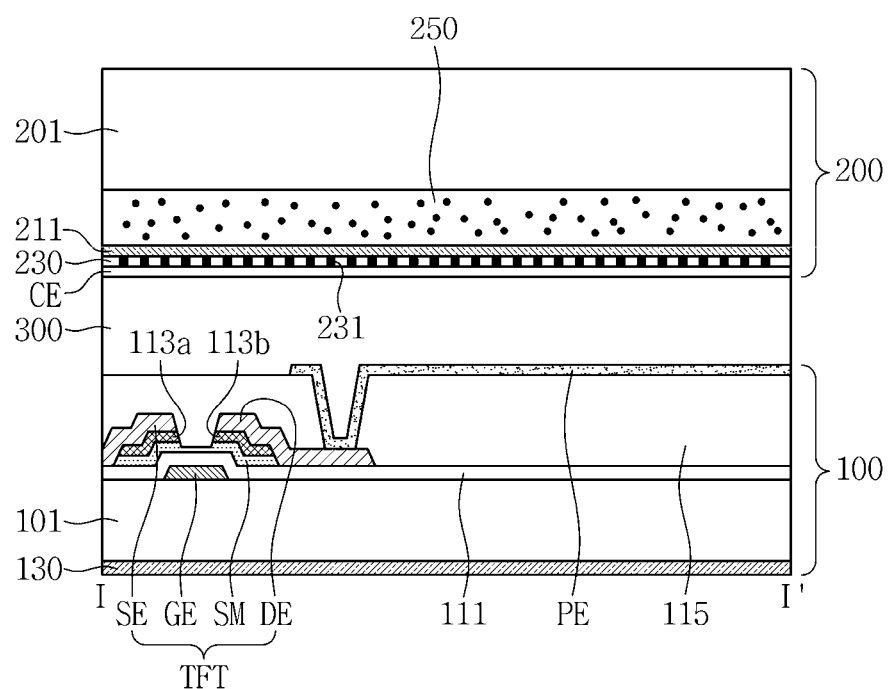
FIG. 4 is a cross-sectional view taken along line I-I' of FIG. 3 according to an exemplary embodiment.

FIG. 3 is a plan view illustrating two adjacent pixels of FIG. 2 and FIG. 4 is a cross-sectional view taken along line I-I' of FIG. 3 according to an exemplary embodiment.

As illustrated in FIGS. 3 and 4, the pixel PX includes a lower polarization plate 130, a lower substrate 101, a thin film transistor ("TFT"), a pixel electrode PE, a gate insulating layer 111, a protective layer 115, the liquid crystal layer 300, a common electrode CE, an upper polarization plate 230, a planarization layer 211, a color conversion portion 250, a light blocking layer 270, a residual pattern 290 and an upper substrate 201.

The lower panel 100 includes the lower substrate 101, the TFT, the pixel electrode PE, the gate insulating layer 111, the protective layer 115 and the lower polarization plate 130.

The lower substrate 101 includes a transparent glass or plastic.

The TFT includes a semiconductor layer SM, a gate electrode GE, a source electrode SE and a drain electrode DE.

The gate electrode GE and the gate line GL1 are unitary (e.g., in a monolithic structure). The gate electrode GE is disposed on the lower substrate 101. At least one of the gate line GL and the gate electrode GE may include or be formed of one of: aluminum (Al) or alloys thereof, silver (Ag) or alloys thereof, copper (Cu) or alloys thereof, or molybdenum (Mo) or alloys thereof. Alternatively, at least one of the gate line GL and the gate electrode GE may include or be formed of one of: chromium (Cr), tantalum (Ta) and/or titanium (Ti). At least one of the gate line GL and the gate electrode GE may have a multilayer structure including at least two conductive layers that have different physical properties.

In an exemplary embodiment, a line GL0 in FIG. 3 is a dummy gate line and is disposed on a substantially same layer as a layer on which the gate line is disposed. The dummy gate line GL0 overlaps pixel electrodes PE of a pixel PX connected to the first gate line GL1. Each storage capacitor Cst described above is formed between the dummy gate line GL0 and the pixel electrode PE of the pixel PX. The dummy gate line GL0 may include a substantially same material as that included in the gate line GL1.

The semiconductor layer SM is disposed on the gate insulating layer 111 to be described below. In such an exemplary embodiment, the semiconductor layer SM overlaps the gate electrode GE disposed below the gate insulating layer 111. The semiconductor layer SM may include amorphous silicon, polycrystalline silicon, or the like.

First and second ohmic contact layers 113a and 113b may be disposed on the semiconductor layer SM. For example, the first and second ohmic contact layers 113a and 113b are disposed on the semiconductor layer SM except a channel area of the semiconductor layer SM. The first ohmic contact layer 113a and the second ohmic contact layer 113b are separated from each other. Each of the first and second ohmic contact layers 113a and 113b may include silicide or n+ hydrogenated amorphous silicon doped with n-type impurity ions, e.g., phosphorus (P), at high concentration.

The source electrode SE and the data lines DL1, DL2 and DL3 are unitary (e.g., in a monolithic structure). The source electrode SE is disposed on the first ohmic contact layer 113a.

The drain electrode DE is disposed on the second ohmic contact layer 113b. The drain electrode DE is connected to the pixel electrode PE.

At least one of the data lines DL1, DL2 and DL3, the source electrode SE and the drain electrode DE may include or be formed of a refractory metal, such as molybdenum, chromium, tantalum, titanium and/or an alloy thereof. Alternatively, at least one of the data lines DL1, DL2 and DL3, the source electrode SE and the drain electrode DE may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer and a molybdenum (alloy) upper layer. In an alternative exemplary embodiment, at least one of the data lines DL1, DL2 and DL3, the source electrode SE and the drain electrode DE may include or be formed of any suitable metals and/or conductors rather than the aforementioned materials.

The pixel electrode PE is disposed on the protective layer 115. In such an exemplary embodiment, the pixel electrode PE is connected to the drain electrode DE through a contact hole CNT of the protective layer 115. The pixel electrode PE may include a transparent conductive material, e.g., indium tin oxide (ITO) or indium zinc oxide (IZO). In such an exemplary embodiment, for example, ITO may include a polycrystalline material or a monocrystalline material and IZO may include a polycrystalline material or a monocrystalline material.

In an exemplary embodiment, the gate insulating layer 111 is disposed over an entire surface of the lower substrate 101 including the gate line GL1 and the gate electrode GE. The gate insulating layer 111 may include or be formed of silicon nitride (SiNx) or silicon oxide (SiOx). Alternatively, the gate insulating layer 111 may have a multilayer structure including at least two insulating layers having different physical properties.

The protective layer 115 is disposed over an entire surface of the lower substrate 101 including the data lines DL1, DL2 and DL3, the source electrode SE and the drain electrode DE. The protective layer 115 may include an inorganic insulating material such as silicon nitride ($SiN_x$) or silicon oxide ($SiO_x$), and in such an exemplary embodiment, an inorganic insulating material having photosensitivity and a dielectric constant of about 4.0 may be used. In addition, the protective layer 115 may have a double-layer structure including a lower inorganic layer and an upper organic layer, which is found to impart excellent insulating properties and not to damage an exposed portion of the semiconductor layer SM. The protective layer 115 may have a thickness greater than or equal to about 5000 Å, e.g., in a range from about 6000 Å to about 8000 Å.

The lower polarization plate 130 is disposed on a rear surface of the lower substrate 101.

Figure 5A:
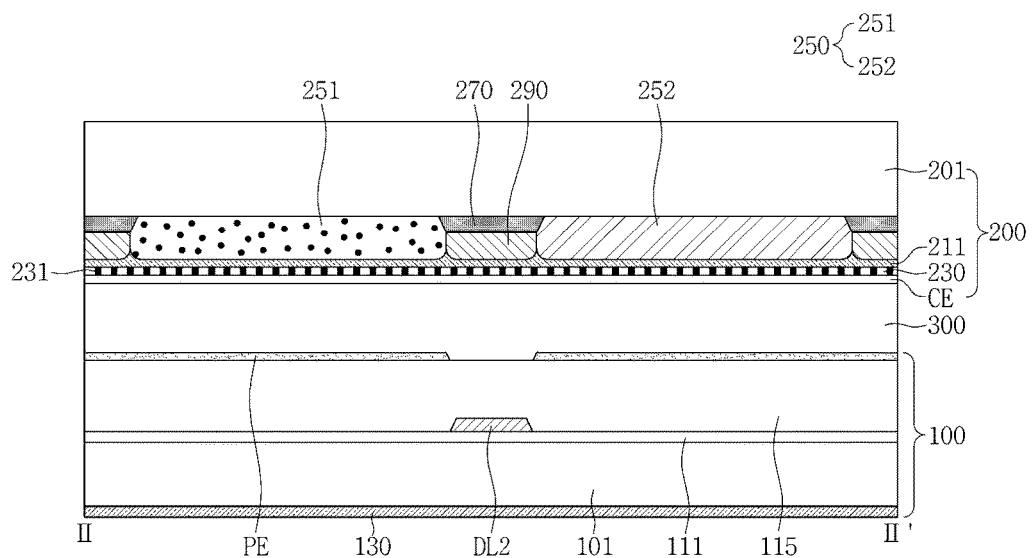
FIG. 5A is a cross-sectional view taken along line II-II' of FIG. 3 according to an exemplary embodiment.
Figure 5B:
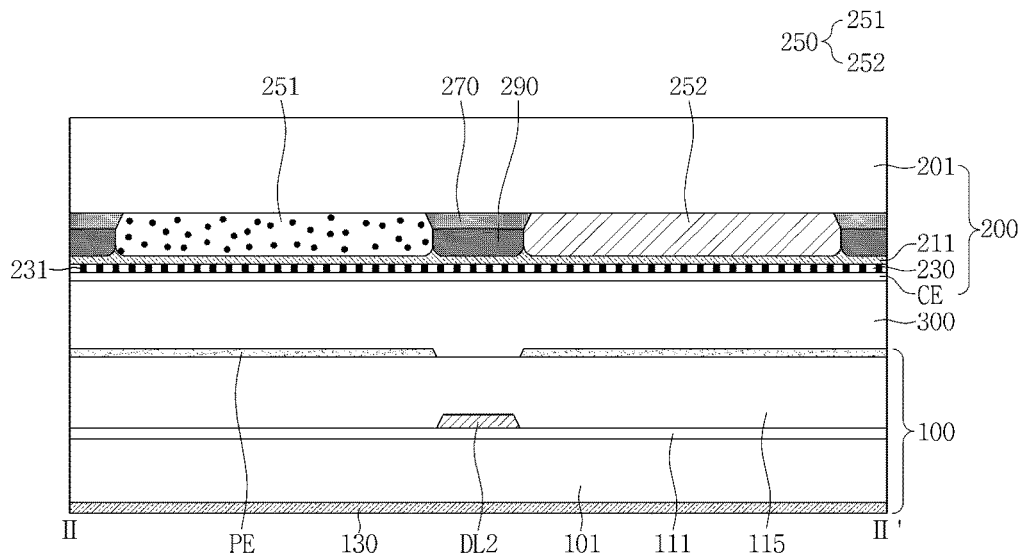
FIG. 5B is another cross-sectional view taken along line II-II' of FIG. 3 according to an exemplary embodiment.
Figure 6:
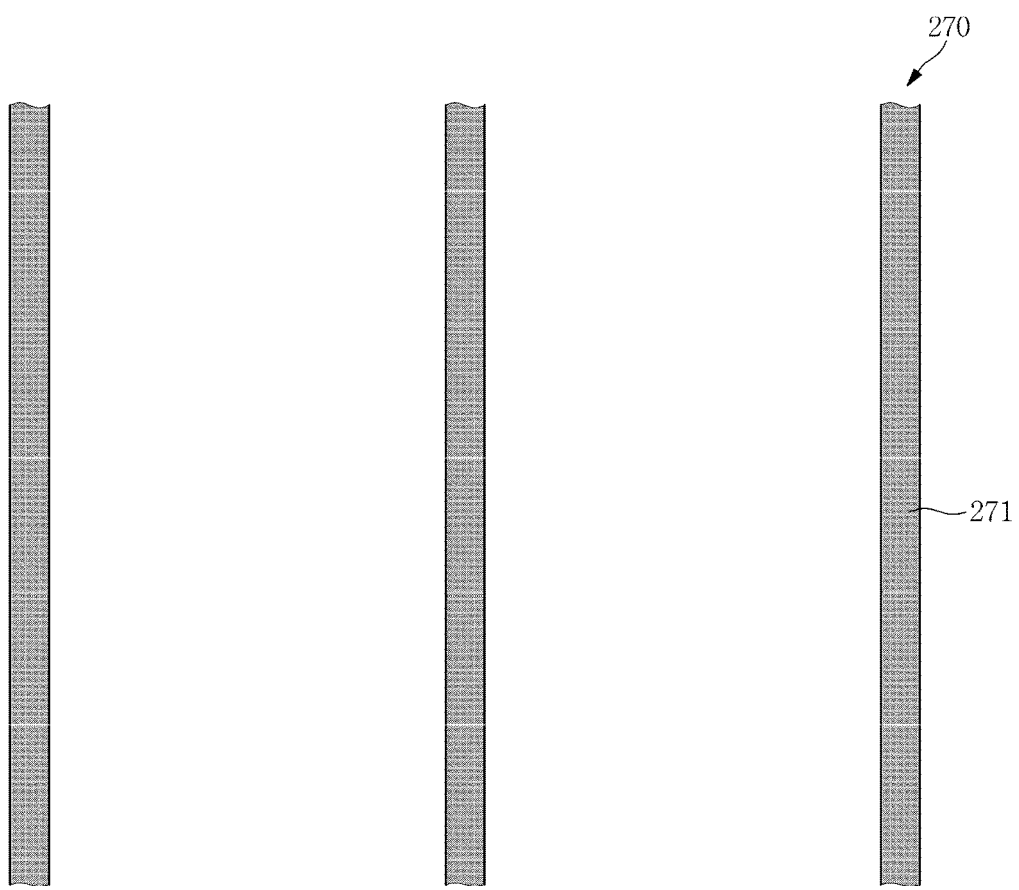
FIG. 6 is a plan view illustrating a light blocking layer according to an exemplary embodiment.
Figure 7:
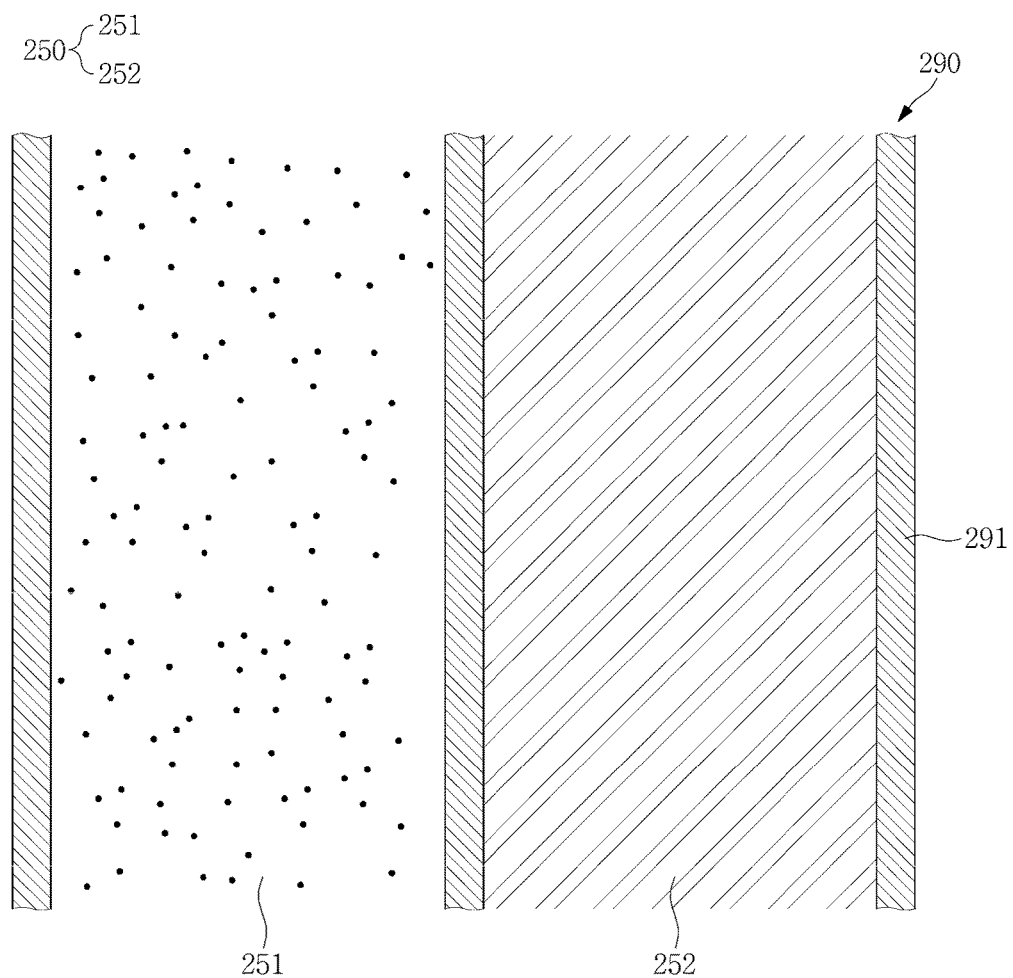
FIG. 7 is a plan view illustrating a residual pattern and a color conversion portion according to an exemplary embodiment.

FIG. 5A is a cross-sectional view taken along line II-II' of FIG. 3 according to an exemplary embodiment, FIG. 5B is another cross-sectional view taken along line II-II' of FIG. 3 according to an exemplary embodiment, FIG. 6 is a plan view illustrating a light blocking layer according to an exemplary embodiment and FIG. 7 is a plan view illustrating a residual pattern and a color conversion portion according to an exemplary embodiment.

Hereinafter, the upper panel 200 will be described in detail with reference to FIGS. 5A, 5B, 6 and 7.

The upper panel 200 includes the upper substrate 201, the light blocking layer 270, the color conversion portion 250, the upper polarization plate 230 and the common electrode CE.

The upper substrate 201 includes a transparent glass or plastic.

The light blocking layer 270 is disposed on the upper substrate 201. The light blocking layer 270 blocks light emitted from the backlight unit 500.

Referring to FIGS. 5A, 5B and 6, the light blocking layer 270 may include a first light blocking pattern 271. The first light blocking pattern 271 may be disposed corresponding to the data lines DL1, DL2 and DL3. In other words, the first light blocking pattern 271 may have a line shape similar to the data lines DL1, DL2 and DL3.

The light blocking layer 270 may be a metal. Accordingly, the light emitted from the color conversion portion 250, to be described below, may be reflected from the light blocking layer 270 including metal, such that the light emission efficiency of the LCD device may be improved.

The residual pattern 290 is disposed on the light blocking layer 270. The residual pattern 290 may have the same planer shape as the light blocking layer 270. The residual pattern 290 may have a width smaller than that of the light blocking layer 270. The residual pattern 290 may include a photosensitive composition of a positive type. However, exemplary embodiments are not limited thereto and the residual pattern 290 may include a photosensitive composition of a negative type. Examples of the photosensitive composition used for forming the residual pattern 290 may include a binder resin, a polymerizable monomer, a polymerizable oligomer, a pigment, a dispersant and a photo initiator. Particularly, as illustrated in FIG. 5B, the residual pattern 290 may include a black pigment or a black resin as the pigment.

Referring to FIGS. 5A, 5B and 7, the residual pattern 290 may include a first residual pattern 291. The first residual pattern 291 may be disposed on the first light blocking pattern 271. In other words, the first residual pattern 291 may be disposed corresponding to the data lines DL1, DL2 and DL3.

The color conversion portion 250 is disposed in a space defined by the residual pattern 290. In other words, the color conversion portion 250 may be disposed between the adjacent residual patterns 290.

The color conversion portion 250 includes wavelength converting particles. For example, the wavelength converting particle may include quantum dot particles. The quantum dot particles convert a wavelength of a light incident onto the quantum dot particles into a light having a desired specific wavelength. The wavelength of the light emitted from the color conversion portion 250 varies depending on the size of the quantum dot particles. In other words, the color of the light emitted from the color conversion portion 250 varies depending on the diameter of the quantum dot.

The quantum dot particle may have a diameter of about 2 nm or more and about 13 nm or less. In general, when the quantum dot particle has a small diameter, the wavelength of the output light is shortened and blue-based light is output. When the diameter of the quantum dot particle increases, the wavelength of the output light is lengthened and red-based light is output. For example, a quantum dot particle having a diameter of about 10 nm may output red light, a quantum dot particle having a diameter of about 7 nm may output green light and a quantum dot particle having a diameter of about 5 nm may output blue light.

Since having a high quantum yield and a high extinction coefficient as compared to those of general fluorescent dyes, the quantum dot particle may generate a significantly intense fluorescent light. In particular, the quantum dot particle may absorb a light of a short wavelength to output a light of a longer wavelength.

The quantum dot particle may have a structure including a core nanocrystal and a shell nanocrystal surrounding the core nanocrystals. In addition, the quantum dot particle may include an organic ligand bonded to the shell nanocrystal and may further include an organic coating layer surrounding the shell nanocrystal.

The shell nanocrystal may have two or more layers. The shell nanocrystal is disposed on a surface of the core nanocrystal.

The quantum dot may include at least one substance of group II compound semiconductors, group III compound semiconductors, group V compound semiconductors and group VI compound semiconductors. For example, the core nanocrystal forming the quantum dot particle may include at least one of: PbSe, InAs, PbS, CdSe, InGaP, CdTe, CdS, ZnSe, ZnTe, ZnS, HgTe and HgS. In addition, the shell nanocrystal may include at least one of: CuZnS, CdSe, CdTe, CdS, ZnSe, ZnTe, ZnS, HgTe and HgS.

For example, in the case where the core nanocrystal includes CdSe, blue light may be emitted when a diameter of the quantum dot particle is in a range from about 1 nm to about 3 nm, green light may be emitted when the diameter of the quantum dot is in a range from about 3 nm to about 5 nm and red light may be emitted when the diameter of the quantum dot is in a range from about 7 nm to about 10 nm.

The quantum dot particle may be formed by a wet-chemical method. The wet-chemical method is a method of growing particles by adding a precursor material to an organic solvent.

Alternatively, the color conversion portion 250 may include quantum rod particles instead of the quantum dot particles described above.

As illustrated in FIGS. 5A, 5B and 7, the color conversion portion 250 may include a first color conversion portion 251, a second color conversion portion 252 and a third color conversion portion (not illustrated). The color conversion portion 250 may extend along the first residual pattern 291 in an area defined by the residual pattern 290. The first color conversion portion 251, the second color conversion portion 252 and the third color conversion portion (not illustrated) may be respectively disposed in respective areas defined by the residual pattern 290. The first color conversion portion 251, the second color conversion portion 252 and the third color conversion portion (not illustrated) may correspond to pixels of different colors. For example, the first color conversion portion 251 may correspond to a red pixel, the second color conversion portion 252 may correspond to a green pixel and the third color conversion portion (not illustrated) may correspond to a blue pixel. In such an exemplary embodiment, the first color conversion portion 251 may include red wavelength converting particles, the second color conversion portion 252 may include green wavelength converting particles and the third color conversion portion (not illustrated) may include blue wavelength converting particles. In addition, the color conversion portion 250 may further include a transmitting portion (not illustrated). In such an exemplary embodiment, the transmitting portion (not illustrated) may correspond to a white pixel and may not include wavelength converting particles. Light passing through the transmitting portion (not illustrated) does not change its wavelength such that the light passing through the transmitting portion (not illustrated) may have a substantially same wavelength as that of the light emitted from the backlight unit 500.

The planarization layer 211 is disposed on the color conversion portion 250 and the residual pattern 290. The planarization layer 211 flattens a curved surface of the color conversion portion 250 and the residual pattern 290 therebelow or substantially prevents the elution of impurities from the layer disposed therebelow.

In an exemplary embodiment, because a total thickness of the light blocking layer 270 and the residual pattern 290 is substantially the same as a thickness of the color conversion portion 250, a height variation of the upper panel 200 including the color conversion portion 250 and the residual pattern 290 is reduced such that the flatness of the planarization layer 211 disposed on the color conversion portion 250 and the residual pattern 290 may be improved.

The upper polarization plate 230 is disposed on the planarization layer 211. A transmission axis of the upper polarization plate 230 and a transmission axis of the lower polarization plate 130 are orthogonal to each other and one of these transmission axes is arranged in parallel with the gate line GL.

According to an exemplary embodiment, the upper polarization plate 230 may include a polarizer 231. The polarizer 231 includes a plurality of line patterns arranged in parallel with the planarization layer 211. Each line pattern has a linear shape extending in one direction, has a predetermined width and is spaced apart from each other at a predetermined interval.

The line pattern may include a metal. The polarizer 231 including the plurality of metal line patterns may be referred to as a wire grid polarizer (WGP). The polarizer 231 according to an exemplary embodiment is a WGP.

The line pattern may include at least one of, for example, aluminum (Al), gold (Au), silver (Ag), copper (Cu), chromium (Cr), iron (Fe) and nickel (Ni).

The polarizer 231 may be formed by methods such as an imprinting method using a mold, a photolithography method, or the like. However, exemplary embodiments are not limited thereto and the polarizer 231 may be formed using a block copolymer.

Since the polarizer 231 is formed in a very thin and uniform line pattern, excellent polarization efficiency may be achieved when the polarizer 231 is disposed on the planarization layer 211 having excellent flatness.

The common electrode CE is disposed on the upper polarization plate 230. For example, the common electrode CE may be disposed over an entire surface of the upper substrate 201 including the upper polarization plate 230. The common electrode CE transmits, for example, a common voltage which is a DC voltage. Alternatively, the common electrode may transmit an alternating voltage. The common electrode CE may include a transparent conductive material such as ITO and IZO.

The common electrode CE applies an electric field to the liquid crystal layer 300 together with the pixel electrode PE. Thus, an electric field is formed over the liquid crystal layer 300 disposed between the common electrode CE and the pixel electrode PE.

The liquid crystal layer 300 includes liquid crystal molecules, which may be liquid crystal molecules having a negative dielectric constant and vertically aligned.

Figure 8A:
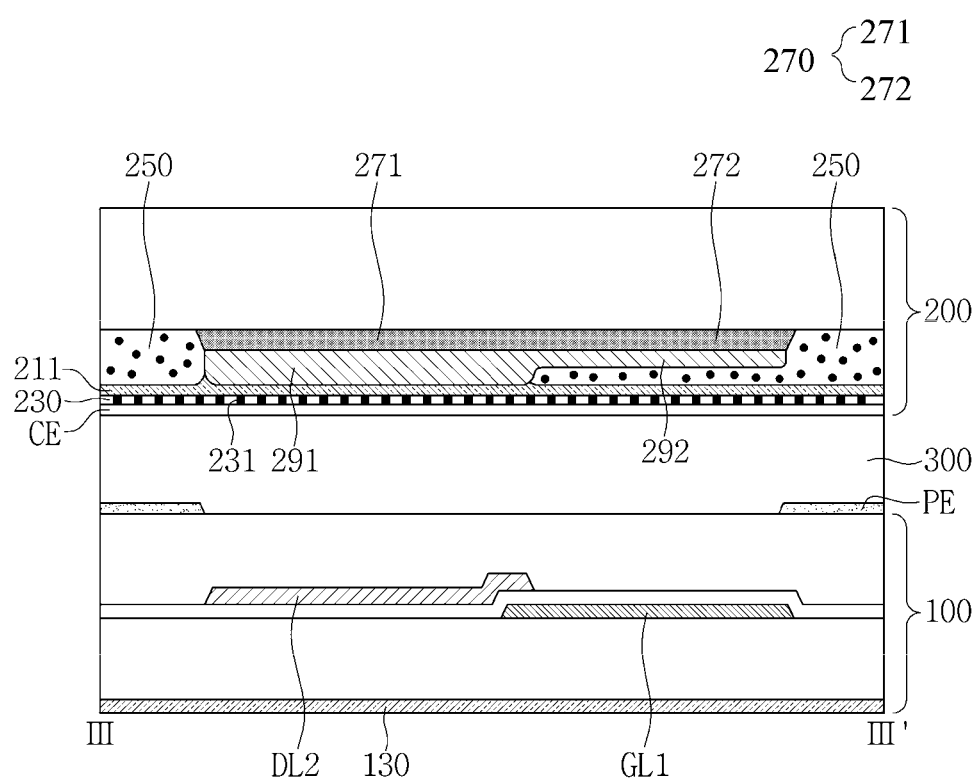
FIG. 8A is a cross-sectional view taken along line III-III' of FIG. 3 according to an alternative exemplary embodiment.
Figure 8B:
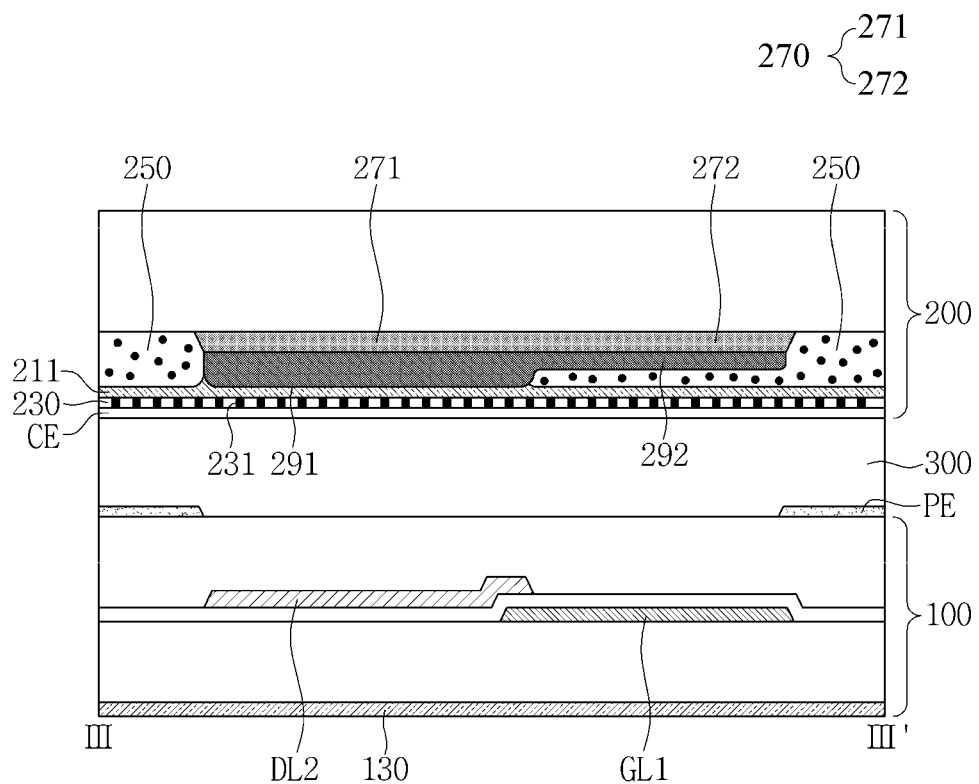
FIG. 8B is another cross-sectional view taken along line III-III' of FIG. 3 according to an alternative exemplary embodiment.
Figure 9:
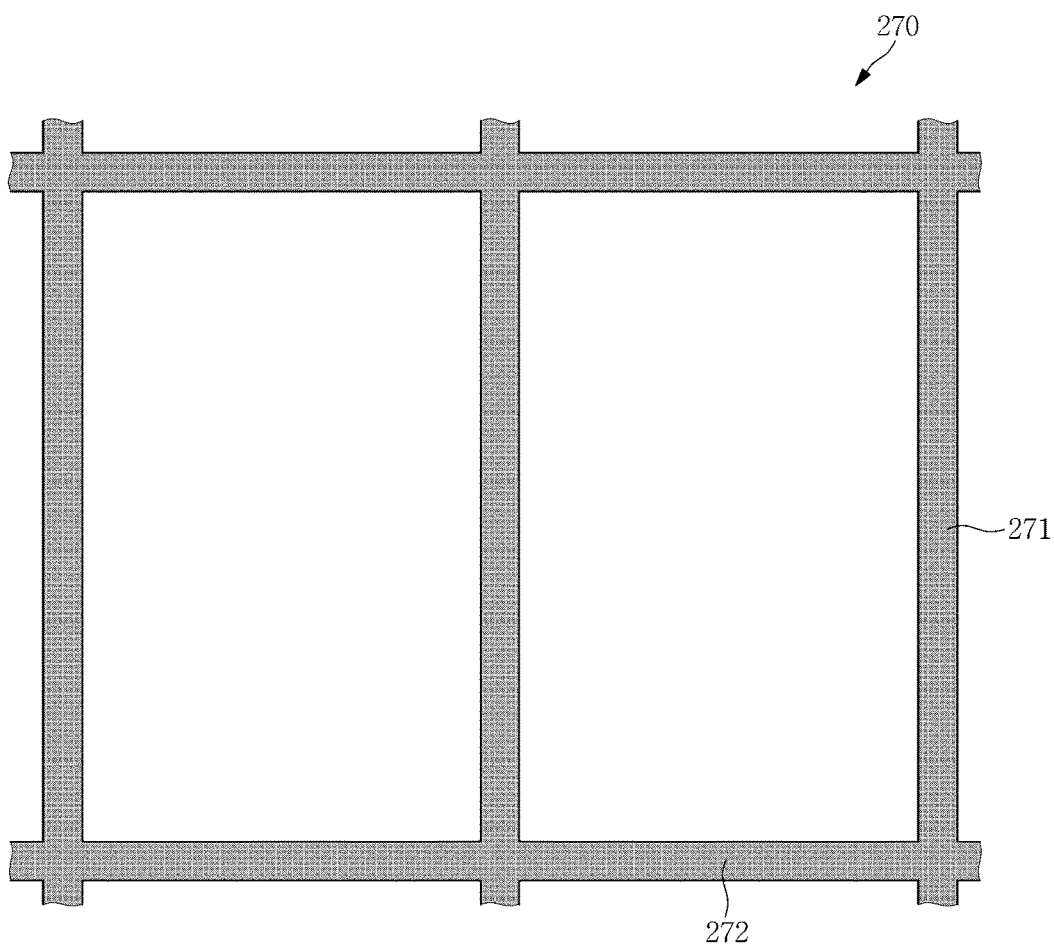
FIG. 9 is a plan view illustrating a light blocking layer according to an alternative exemplary embodiment.
Figure 10:
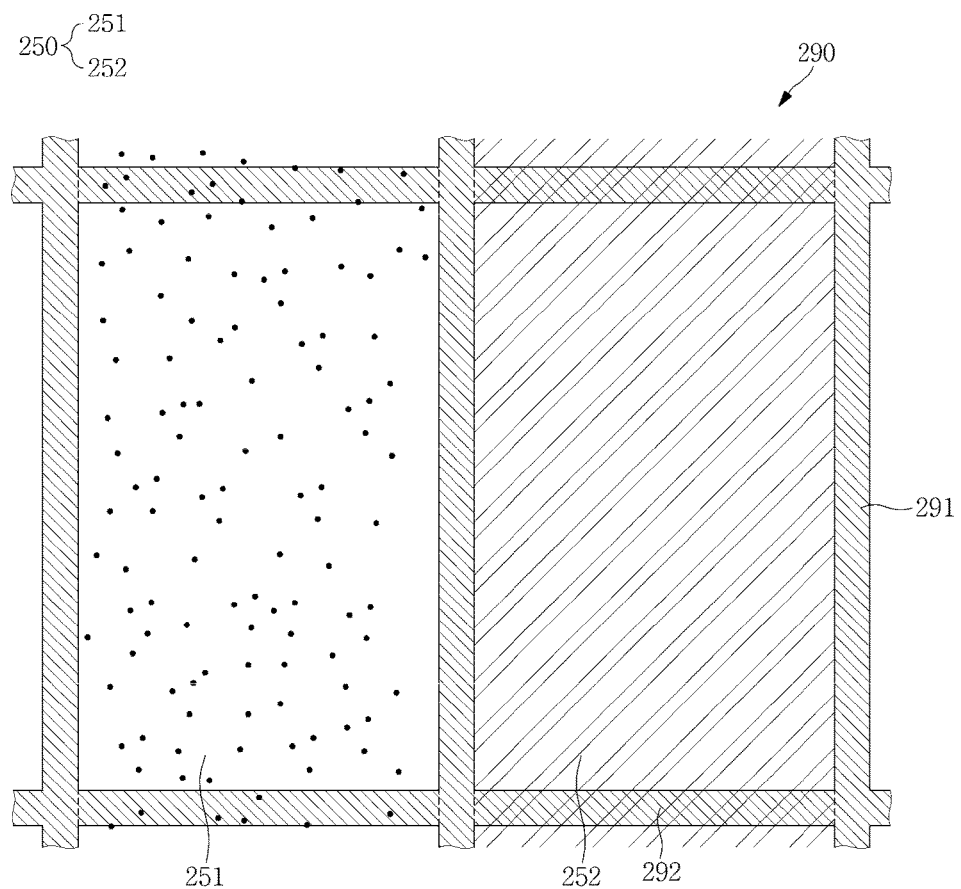
FIG. 10 is a plan view illustrating a residual pattern and a color conversion portion according to an alternative exemplary embodiment.

FIG. 8A is a cross-sectional view taken along line III-III' of FIG. 3 according to an alternative exemplary embodiment, FIG. 8B is another cross-sectional view taken along line III-III' of FIG. 3 according to an alternative exemplary embodiment, FIG. 9 is a plan view illustrating a light blocking layer according to an alternative exemplary embodiment and FIG. 10 is a plan view illustrating a residual pattern and a color conversion portion according to an alternative exemplary embodiment.

The descriptions related to the LCD device according to an exemplary embodiment will be omitted from the descriptions related to the LCD device according to an alternative embodiment.

Referring to FIGS. 8A, 8B and 9, the light blocking layer 270 may further include a second light blocking pattern 272. The second light blocking pattern 272 may be disposed corresponding to the gate line GL1.

Referring to FIGS. 8A, 8B and 10, the residual pattern 290 may further include a second residual pattern 292 disposed on the second light blocking pattern 272. In other words, the second residual pattern 292 may be disposed corresponding to the gate line GL1. In such an exemplary embodiment, the first residual pattern 291 may have a different height from a height of the second residual pattern 292. For example, as illustrated in FIGS. 8A and 8B, the first residual pattern 291 may have a greater height than a height of the second residual pattern 292. For example, as illustrated in FIG. 8B, the residual pattern 290 may include a black pigment or a black resin as the pigment.

Although the first residual pattern 291 is depicted as being disposed corresponding to an area where the gate line GL1 overlaps the data lines DL1, DL2 and DL3, exemplary embodiments are not limited thereto. Alternatively, the second residual pattern 292 may be disposed in an area where the gate line GL1 overlaps the data lines DL1, DL2 and DL3.

As illustrated in FIG. 10, the color conversion portion 250 may be disposed, extending along the first residual pattern 291 in a space defined by the first residual pattern 291. In such an exemplary embodiment, the color conversion portion 250 may be disposed on the second residual pattern 292 to overlap the second residual pattern 292 in a plan view.

According to an exemplary embodiment, a step difference formed in the upper panel 200 including the color conversion portion 250 and the residual pattern 290 may be reduced by the residual pattern 290. Accordingly, the flatness of the upper panel 200 including the planarization layer 211 may be improved. A total thickness of the second light blocking pattern 272, the second residual pattern 292 and the color conversion layer 250 on the second residual pattern 292 is substantially the same as a thickness of the color conversion portion 250 in a light transmission region which is not covered by the light blocking layer 270. A total thickness of the first light blocking pattern 271 and the first residual pattern 291 is substantially the same as a thickness of the color conversion portion 250 in a light transmission region which is not covered by the light blocking layer 270.

FIGS. 11A, 11B, 11C, 11D, 11E, 11F and 11G are cross-sectional views illustrating a manufacturing process according to an exemplary embodiment.

Hereinafter, the manufacturing process according to an exemplary embodiment will be described with reference to FIGS. 11A, 11B, 11C, 11D, 11E, 11F and 11G.

Figure 11A:
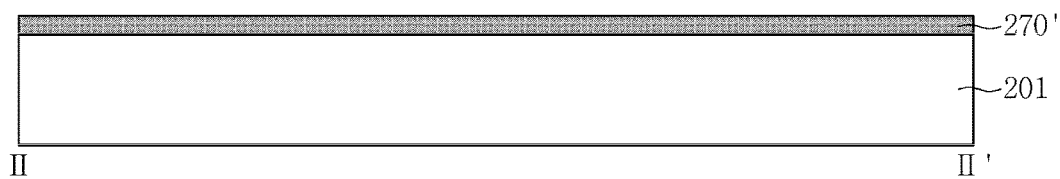
FIGS. 11A, 11B, 11C, 11D, 11E, 11F and 11G are cross-sectional views illustrating a manufacturing process according to an exemplary embodiment.

Referring to FIG. 11A, a light blocking layer forming material 270' is formed on an upper substrate 201. The light blocking layer forming material 270' may be a metal.

Figure 11B:
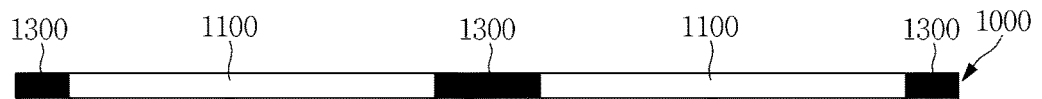
Figure 11B:
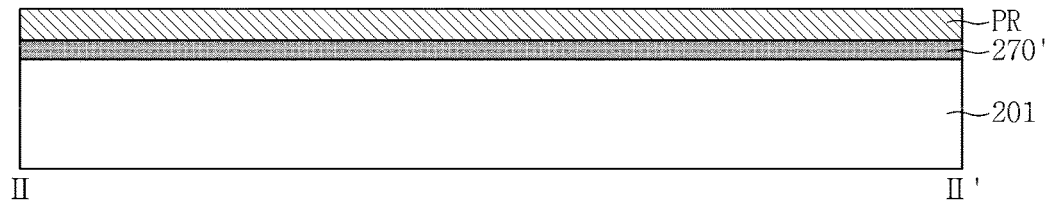

Referring to FIG. 11B, a photoresist PR is applied on the upper substrate 201 to which the light blocking layer forming material 270' is formed.

The photoresist PR may be formed through a chemical vapor deposition process, a spin coating process, a sputtering process, a vacuum deposition process, a printing process, an inkjet process, or the like.

The photoresist PR may include a photosensitive composition of a positive type. However, exemplary embodiments are not limited thereto, and the photoresist PR may include a photosensitive composition of a negative type. The photosensitive composition used to form the photoresist PR may include, for example, a binder resin, a polymerizable monomer, a polymerizable oligomer, a pigment, a dispersant, a photoinitiator, or the like. According to an alternative exemplary embodiment, the photosensitive composition used to form the photoresist PR may include, for example, a black pigment, a black resin, or the like, as a pigment. The photoresist PR according to an exemplary embodiment is assumed to be a positive type material in which an exposed portion is developed and a non-exposed portion remains, but exemplary embodiments are not limited thereto.

Subsequently, a mask 1000 is disposed on the photoresist PR, spaced apart from the photoresist PR. The mask 1000 has a light transmitting portion 1100 and a light blocking portion 1300. A transmitting portion 1100 may have a light transmittance of about 95% or more and a light blocking portion 1300 may have a light transmittance of about 5% or less.

The light blocking portion 1300 of the mask 1000 may be positioned above an area where the light blocking layer 270 is to be formed and the light transmitting portion 1100 may be positioned above the remaining area.

Subsequently, a light is irradiated using the mask 1000 and then developing and curing may be performed.

Figure 11C:
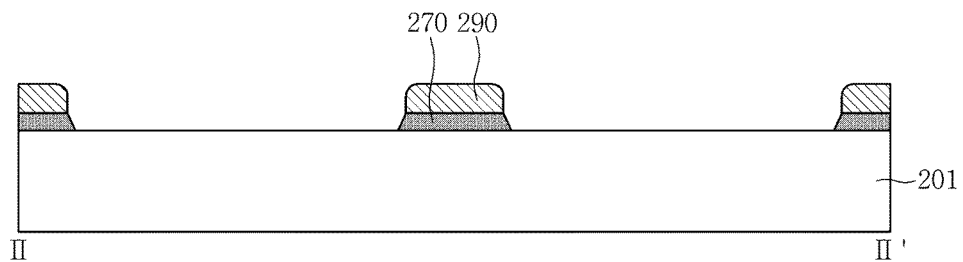

Referring to FIG. 11C, the photoresist PR below the light transmitting portion 1100 is substantially completely removed to expose the light blocking layer forming material 270', and the photoresist PR positioned below the light blocking portion 1300 remains. That is, the photoresist PR below the light blocking portion 1300 remains to form a residual pattern 290.

Accordingly, the method of manufacturing an LCD device according to an exemplary embodiment may form the residual pattern 290 without adding any additional process.

Next, the light blocking layer forming material 270' is etched using the residual pattern 290 as an etching mask.

Figure 11D:
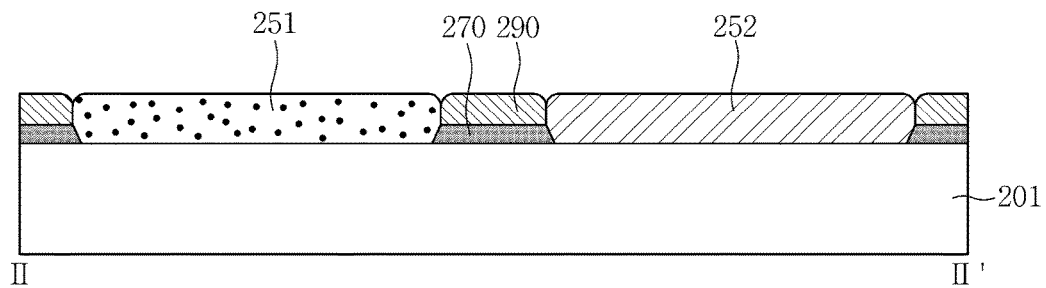

Referring to FIG. 11D, color conversion portions 251 and 252 are formed in an area defined by the residual pattern 290. In such an exemplary embodiment, the color conversion portions 251 and 252 may be formed through a chemical vapor deposition process, a spin coating process, a sputtering process, a vacuum deposition process, a printing process, an inkjet process, or the like. For example, in the case where the color conversion portions 251 and 252 are formed through an inkjet process, the residual pattern 290 may serve as a dam. For example, the first color conversion portion 251 and the second color conversion portion 252 are disposed in two adjacent areas among the area defined by the residual pattern 290 and the color mixture may be substantially prevented by the residual pattern 290.

Figure 11E:
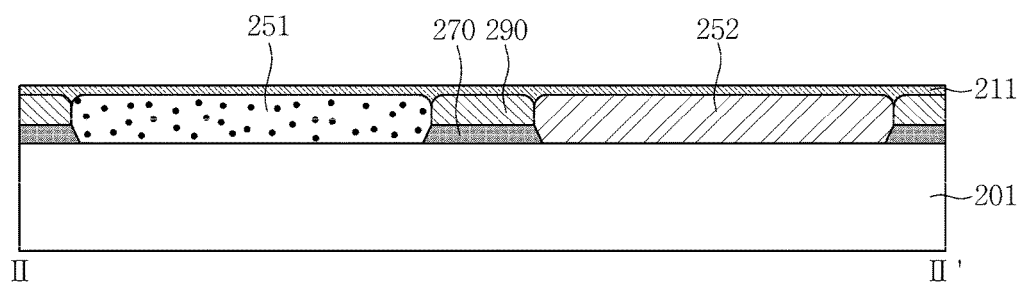

Next, referring to FIG. 11E, a planarization layer 211 is formed on the color conversion portions 251 and 252 and the residual pattern 290. In such an exemplary embodiment, the height difference between the color conversion portion 250 and the residual pattern 290 is relatively small and the flatness of an upper panel 200 including the planarization layer 211 may be improved.

Figure 11F:
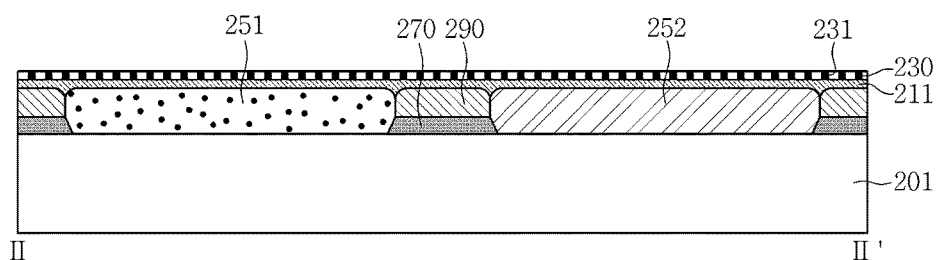

Next, referring to FIG. 11F, an upper polarization plate 230 is disposed on the planarization layer 211. A transmission axis of the upper polarization plate 230 and a transmission axis of a lower polarization plate 130 are orthogonal to each other and one of these transmission axes may be arranged in parallel with the gate line GL.

The polarizer 231 may be formed through an imprinting method using a mold, a photolithography method, or the like. However, exemplary embodiments are not limited thereto, and the polarizer 231 may be formed using a block copolymer.

Figure 11G:
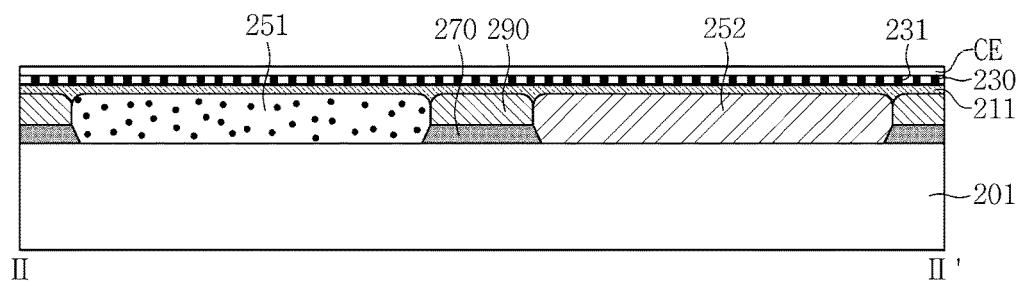

Next, referring to FIG. 11G, a common electrode CE is disposed on the upper polarization plate 230. The common electrode CE may be manufactured by known methods. Accordingly, the upper panel 200 may be provided.

The upper panel 200 manufactured in FIG. 11G is disposed to oppose the lower panel 100 and a liquid crystal layer 300 is disposed therebetween. Alternatively, the liquid crystal layer 300 may be disposed on the lower panel 100 and the upper panel 200 may be disposed thereon.

FIGS. 12A, 12B, 12C, 12D, 12E, 12F and 12G are cross-sectional views illustrating a manufacturing process according to an alternative exemplary embodiment.

The descriptions of the method of manufacturing an LCD device according to an exemplary embodiment will be omitted from the descriptions related to a method of manufacturing an LCD device according to an alternative exemplary embodiment.

Figure 12A:
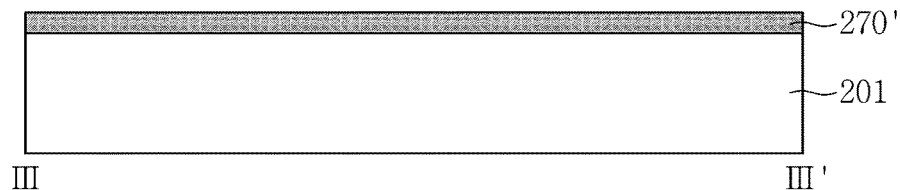
FIGS. 12A, 12B, 12C, 12D, 12E, 12F and 12G are cross-sectional views illustrating a manufacturing process according to an alternative exemplary embodiment.

Referring to FIG. 12A, a light blocking layer forming material 270' is formed on an upper substrate 201. The light blocking layer forming material 270' may be a metal.

Figure 12B:
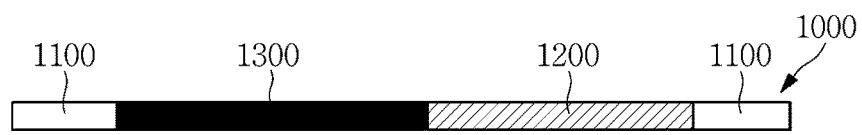
Figure 12B:
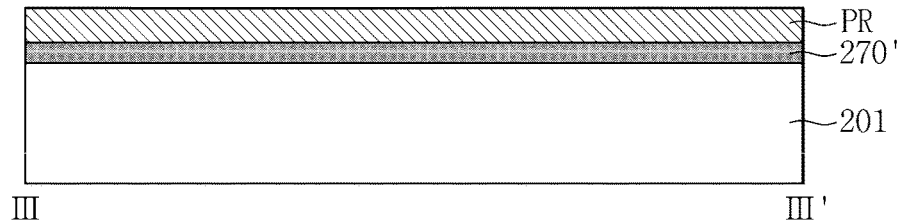

Referring to FIG. 12B, a photoresist PR is applied on the upper substrate 201 to which the light blocking layer forming material 270' is formed.

Subsequently, a mask 1000 is disposed on the photoresist PR, spaced apart from the photoresist PR. The mask 1000 has a transmitting portion 1100, a semi-light transmitting portion 1200 and a light blocking portion 1300. In an alternative exemplary embodiment, the mask 1000 may include a slit portion instead of a semi-light transmitting portion 1200.

A transmitting portion 1100 may have a light transmittance of about 95% or more, the semi-light transmitting portion 1200 may have a light transmittance ranging from about 20% to about 40% and a light blocking portion 1300 may have a light transmittance of about 5% or less.

The light blocking portion 1300 of the mask 1000 may be positioned above an area where a first light blocking pattern 271 is to be formed, the semi-light transmitting portion 1200 may be positioned above an area where a second light blocking pattern 272 is to be formed and the light transmitting portion 1100 may be positioned above the remaining area.

Then, a light is irradiated using the mask 1000 and then developing and curing may be performed.

Figure 12C:
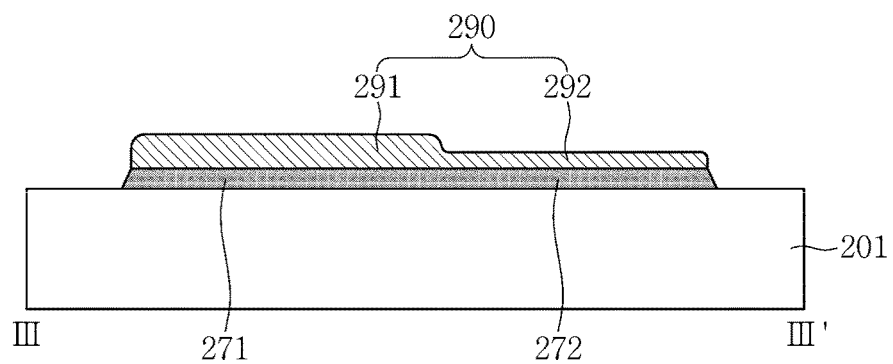

Referring to FIG. 12C, the photoresist PR disposed below the light transmitting portion 1100 is substantially completely removed to expose the light blocking layer forming material 270' and the photoresist PR disposed below the semi-light transmitting portion 1200 and the light blocking portion 1300 remains but have different heights. That is, the photoresist PR disposed below the light blocking portion 1300 is left as it is to form a first residual pattern 291 and the photoresist PR disposed below the semi-light transmitting portion 1200 is partially removed to form a second residual pattern 292.

Next, the light blocking layer forming material 270' is etched using the first residual pattern 291 and the second residual pattern 292 as an etching mask. Accordingly, the first light blocking pattern 271 and the second light blocking pattern 272 are formed, the first residual light pattern 291 is disposed on the first light blocking pattern 271 and the second residual pattern 292 is disposed on the second light blocking pattern 272.

Figure 12D:
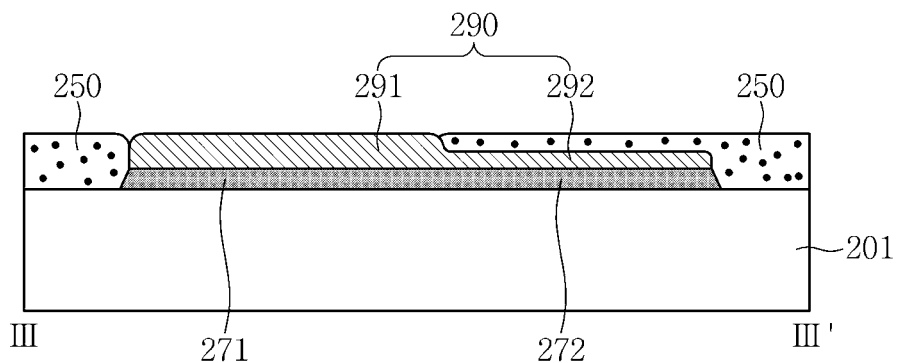

Referring to FIG. 12D, a color conversion portion 250 is formed in an area defined by the first residual pattern 291 and the second residual pattern 292.

Figure 12E:
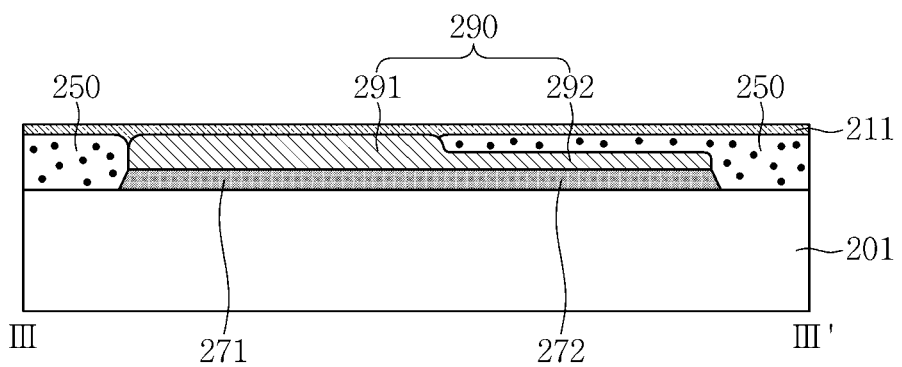

Next, referring to FIG. 12E, a planarization layer 211 is formed on the color conversion portion 250 and the residual pattern 290. In such an exemplary embodiment, the height difference between the color conversion portion 250 and the residual pattern 290 is relatively small and thus the flatness of the upper panel 200 including the planarization layer 211 may be improved.

Figure 12F:
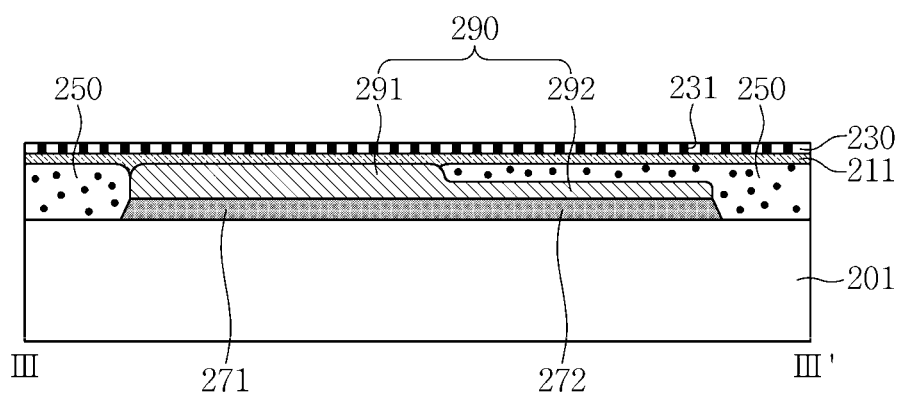

Next, referring to FIG. 12F, an upper polarization plate 230 is disposed on the planarization layer 211.

Figure 12G:
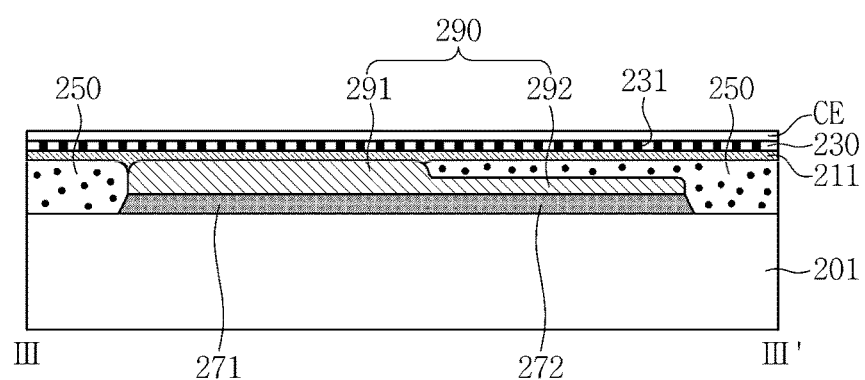

Next, referring to FIG. 12G, a common electrode CE is disposed on the upper polarization plate 230. Accordingly, the upper panel 200 may be provided.

The upper panel 200 manufactured in FIG. 12G is disposed to oppose the lower panel 100 and a liquid crystal layer 300 is disposed therebetween. Alternatively, the liquid crystal layer 300 may be disposed on the lower panel 100 and the upper panel 200 may be disposed thereon.

As set forth hereinabove, the LCD device and the method of manufacturing the LCD device according to one or more exemplary embodiments provide the following effects.

First, the flatness of the residual pattern which is the lower layer of the polarizer may be improved.

Second, in the case where the color conversion portion is formed using an inkjet process, color mixture may be substantially prevented by the residual pattern.

Third, in the case where the color conversion portion is formed using an inkjet process, the residual pattern may serve as a dam.

While the present inventive concept has been illustrated and described with reference to the exemplary embodiments thereof, it will be apparent to those of ordinary skill in the art that various changes in form and detail may be made thereto without departing from the spirit and scope of the present inventive concept.

What is claimed is:

1. A liquid crystal display device comprising:
an upper substrate;
a light blocking layer disposed on the upper substrate;
a residual pattern disposed on the light blocking layer;
a color conversion portion disposed at an area defined by the residual pattern;
a planarization layer disposed on the color conversion portion and the residual pattern; and
an upper polarization plate disposed on the planarization layer,
wherein the residual pattern has substantially the same planar shape as the light blocking pattern.

2. The liquid crystal display as claimed in claim 1, wherein the upper polarization plate comprises a wire grid polarizer (WGP).

3. The liquid crystal display as claimed in claim 1, wherein the color conversion portion includes at least one of quantum dot particles or quantum rod particles.

4. The liquid crystal display as claimed in claim 1, wherein the light blocking layer comprises a metal.

5. The liquid crystal display as claimed in claim 1, wherein the light blocking layer comprises a first light blocking pattern and a second light blocking pattern crossing the first light blocking pattern.

6. The liquid crystal display as claimed in claim 5, wherein the residual pattern comprises a first residual pattern disposed on the first light blocking pattern and a second residual pattern disposed on the second light blocking pattern.

7. The liquid crystal display as claimed in claim 6, wherein the first residual pattern has a different height from a height of the second residual pattern.

8. The liquid crystal display as claimed in claim 1, wherein the residual pattern comprises a black pigment or a black resin.

9. The liquid crystal display as claimed in claim 1, wherein the residual pattern has a width smaller than that of the light blocking pattern.

10. The liquid crystal display as claimed in claim 9, wherein a total thickness of the light blocking layer and the residual pattern is substantially the same as that of the color conversion portion.

11. The liquid crystal display as claimed in claim 1, wherein the light blocking layer is interposed between the residual pattern and the upper substrate.

12. A method of manufacturing a liquid crystal display device, the method comprising:
forming a light blocking layer and a residual pattern on an upper substrate;
forming a color conversion portion on a transmission region defined by the light blocking layer and a residual pattern on the upper substrate;
forming a planarization layer on the residual pattern and the color conversion portion; and
forming an upper polarization plate on the planarization layer,
wherein the residual pattern has substantially the same planar shape as the light blocking pattern.

13. The method as claimed in claim 12, wherein the upper polarization plate comprises a wire grid polarizer (WGP).

14. The method as claimed in claim 12, wherein the color conversion portion comprises quantum dot particles or quantum rod particles.

15. The method as claimed in claim 12, wherein the light blocking layer comprises a metal.

16. The method as claimed in claim 12, wherein the forming of the light blocking layer and the residual pattern on the upper substrate comprises:
forming a light blocking layer forming material on the upper substrate;
applying a photoresist on the light blocking layer forming material;
patterning the photoresist; and
etching the light blocking layer forming material using the patterned photoresist as an etching mask.

17. The method as claimed in claim 12, wherein the residual pattern comprises a black pigment or a black resin.

18. The method as claimed in claim 12, wherein the forming of the color conversion portion uses an inkjet process.

19. The method as claimed in claim 12, wherein the residual pattern has a width smaller than that of the light blocking pattern.

20. The method as claimed in claim 12, wherein the light blocking layer is formed between the residual pattern and the upper substrate.

\* \* \* \* \*